(12) United States Patent
Copeland (10) Patent No.: US 10,088,082 B2
(45) Date of Patent: Oct. 2, 2018

(54) PIPE JOINT GASKET AND METHOD OF MAKING SAME

(71) Applicant: Daniel A. Copeland, Bessemer, AL (US)

(72) Inventor: Daniel A. Copeland, Bessemer, AL (US)

(73) Assignee: McWane, Inc., Birmingham, AL (US)

( * ) Notice: Subject to any disclaimer, the term of this patent is extended or adjusted under 35 U.S.C. 154(b) by 65 days.

(21) Appl. No.: 13/896,692

(22) Filed: May 17, 2013

(65) Prior Publication Data

US 2017/0114933 A1 Apr. 27, 2017

(51) Int. Cl.
*F16L 21/03* (2006.01)

(52) U.S. Cl.
CPC .................................. *F16L 21/03* (2013.01)

(58) Field of Classification Search
CPC ........ F16J 15/0887; F16J 15/061; F16L 21/03
USPC ....... 277/602, 603, 606, 607, 608, 609, 615, 277/616, 619, 620, 624, 626
See application file for complete search history.

(56) References Cited

U.S. PATENT DOCUMENTS

| | | | | |
|---|---|---|---|---|
| 3,963,298 A | * | 6/1976 | Seiler | F16L 37/0845 277/625 |
| 4,229,026 A | * | 10/1980 | Seiler | F16L 37/52 277/615 |
| 5,067,751 A | * | 11/1991 | Walworth | F16L 21/03 285/105 |
| 5,295,697 A | * | 3/1994 | Weber | F16L 37/0845 277/616 |
| 5,464,228 A | * | 11/1995 | Weber | F16L 37/0845 277/615 |
| 6,688,652 B2 | * | 2/2004 | Holmes, IV | F16L 37/0845 285/105 |
| 8,857,861 B2 | * | 10/2014 | German | F16L 37/0845 285/105 |
| 2004/0075217 A1 | * | 4/2004 | Copeland | F16L 21/04 277/314 |
| 2005/0218605 A1 | * | 10/2005 | Walworth | F16L 37/0845 277/609 |
| 2009/0060635 A1 | * | 3/2009 | Jones | F16L 37/0845 403/14 |
| 2013/0043656 A1 | * | 2/2013 | Copeland | F16L 37/0845 277/314 |
| 2013/0229010 A1 | * | 9/2013 | Percebois | F16L 37/0845 285/81 |

* cited by examiner

*Primary Examiner* — Kristina R Fulton
*Assistant Examiner* — L. Susmitha Koneru
(74) *Attorney, Agent, or Firm* — C. Brandon Browning; Maynard, Cooper & Gale (57) ABSTRACT

A gasket for preventing separation of interconnected pipes including a compressible body having a plurality of metal segments partially embedded therein. Each of the metal segments includes an inner surface having at least one tooth configured for engaging a spigot end of a pipe and an outer surface having an arm with a substantially flat portion arranged adjacent to a forward section of a retainer groove of the gasket, the substantially flat portion being configured for displacing the segment radially and axially upon insertion of the spigot end into a bell end of the other pipe thereby decreasing the spigot insertion force required to seat the spigot end within the bell end and the gasket.

17 Claims, 12 Drawing Sheets

PIPE JOINT GASKET AND METHOD OF MAKING SAME

FIELD OF THE INVENTION

The present invention is directed to a pipe joint gasket and more particularly to a pipe joint gasket including an arrangement of metal segments configured for decreasing spigot insertion force during pipe joint formation and preventing the separation and fracturing of interconnected, telescoping pipes during fluid pressurization.

BACKGROUND OF THE INVENTION

Pipe joint gaskets including anti-slip segments for preventing the separation of interconnected, telescoping pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced uniformly around its inner perimeter. The toothed metal segments bite into the outer surface of the spigot of the inserted pipe and prevent withdrawal of the inserted pipe from a bell end of the other pipe. The metal segments pivot about a retainer bead in the bell end of the other pipe to allow the spigot end to be inserted into the bell end of the other pipe while preventing withdrawal of the inserted pipe under high fluid pressure conditions.

A shortcoming of such gaskets is that during fluid pressurization of the interconnected pipes, the axial thrust force generated by the resulting hydrostatic pressure can cause the metal segments to over-rotate about the retainer bead resulting in destructive radial loads being exerted through the metal segments upon the inner radial surface of the bell end and the outer radial surface of the spigot end. In many instances, these radial loads are great enough to fracture the spigot and bell ends of the pipes. An additional shortcoming of such gaskets is that during insertion of the spigot into the bell end, the toothed metal segments bite into the spigot causing the gaskets to translate axially with the spigot as it is inserted farther into the bell end. In these instances, the gaskets may end up improperly positioned within the bell end thereby failing to form the requisite seal between the bell end and spigot upon pressurization. Further, when a gasket is improperly positioned, the force required to insert the spigot end into the bell end may increase substantially.

SUMMARY OF THE INVENTION

The present invention is directed to a gasket for decreasing the amount of force required to insert a spigot end of a plastic pipe, such as PVC pipe, into a bell end of a metal pipe, such a ductile iron pipe, and preventing the separation and fracturing of the resulting pipe joint. According to one aspect of the invention, there is provided a method of forming a seal between a spigot end of a first pipe and a bell end of a second pipe, the bell end including a retainer groove defined, at least in part, by a front wall and a retainer groove shoulder. The method includes providing a gasket having a compressible body with a heel, a sealing portion and a plurality of metal segments at least partially embedded in the heel portion. At least one of the metal segments has an outer radial surface, an inner radial surface and at least one tooth extending radially inwardly from the inner radial surface. The gasket is placed into the gasket receiving groove, and the spigot end is inserted into the bell end and through the gasket. Insertion of the spigot end through the gasket causes the at least one metal segment to translate a distance in a desired direction, which includes a radially outward component and an axial component that is away from a direction of movement of the spigot end as it is inserted into the bell end and through the gasket.

The desired translation direction is achieved, at least in part, by bearing, either directly or indirectly through the compressible body, a substantially flat portion of the outer radial surface of the metal segment against the retainer groove shoulder. The substantially flat portion is supported on an arm that is arranged at an obtuse angle to the inner radial surface and that extends radially outward toward and into the heel portion. In combination with a nose portion of the metal segment, which is formed along the intersection of the outward radial surface and the inner radial surface, the arm is arranged to bear against a front wall of the gasket retainer groove to prevent separation of the pipes when the resulting joint is pressurized. In certain instances, the nose and the arm may be bent away from one another during over-pressurization of the pipe joint as they bear against the front wall.

DETAILED DESCRIPTION OF PRESENTLY PREFERRED EMBODIMENTS

Figure 11:
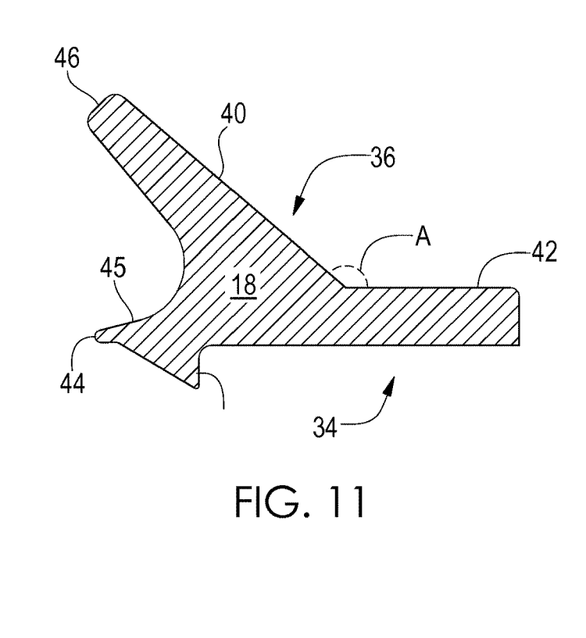
FIG. 11 is a sectional view of an alternative metal segment in accordance with the present invention.
Figure 12:
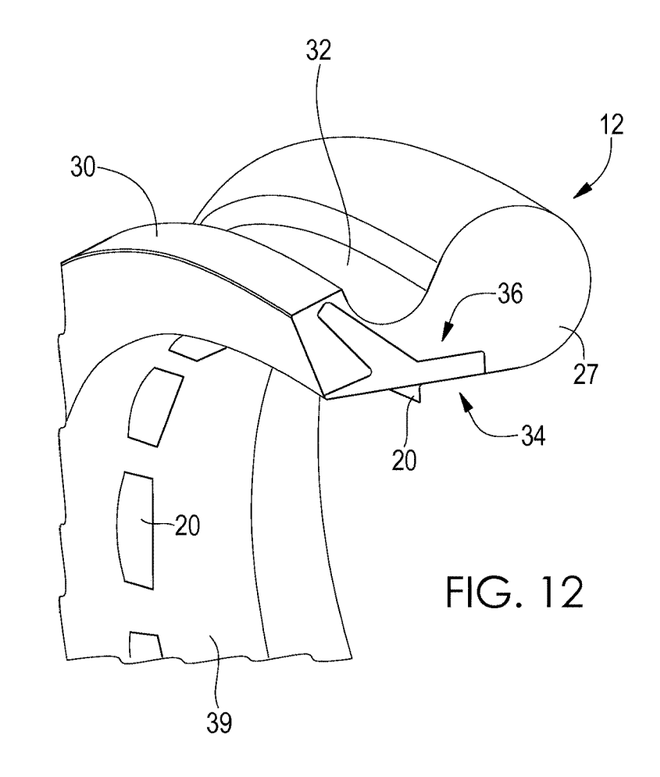
FIG. 12 is a sectional view of an alternative metal segment in accordance with the present invention.
Figure 13:
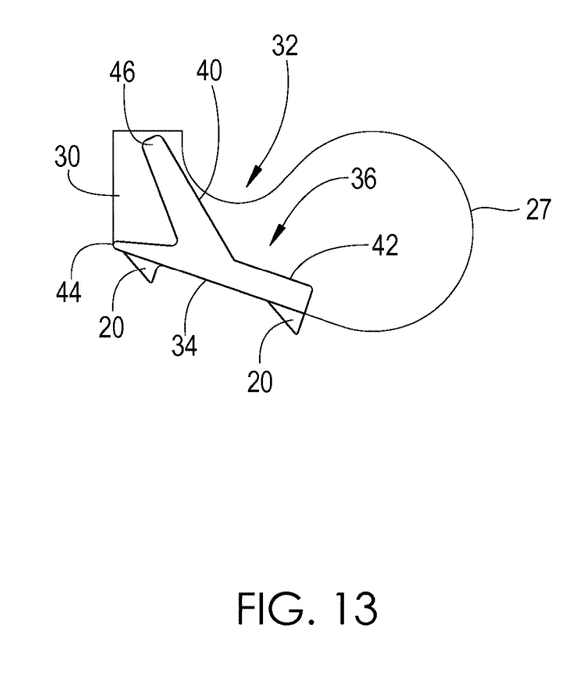
FIG. 13 is a sectional view of an alternative metal segment in accordance with the present invention.
Figure 14:
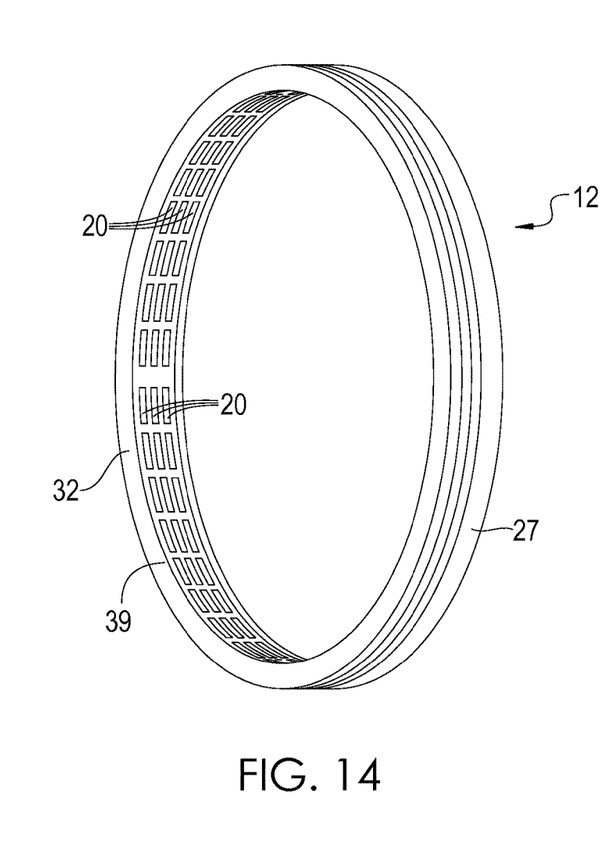
FIG. 14 is a top view of a gasket of the present invention showing the placement of metal segments around its periphery.

FIGS. 1 through 10 depict a fragmented cross-sectional view of a bell end 10 of a metal pipe using a gasket 12 of the present invention, a spigot end 14 of a plastic pipe entering the pipe bell and the operation of gasket 12 upon the fluid pressurization and over-pressurization of a pipe joint 16 created between bell end 10 and spigot end 14. In particular, these figures illustrate the arrangement and operation of metal segments 18 in gasket 12 relative to bell end 10 and spigot end 14 during the formation, fluid pressurizing and fluid over-pressurization of joint 16. FIGS. 11 through 13 depict variations of the metal segments that may be used in gasket 12. FIG. 14 is provided to show the circumferential arrangement and spacing of metal segments 18 throughout gasket 12.

Figure 1:
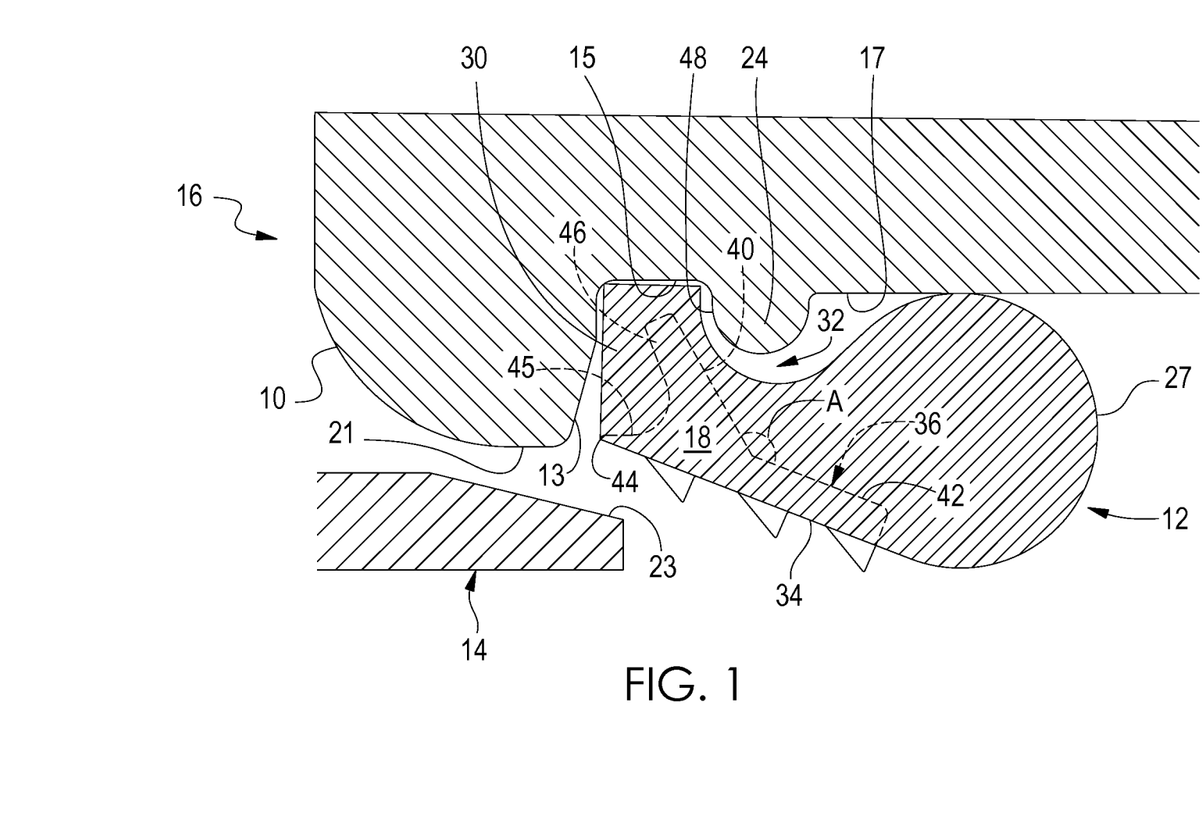
FIG. 1 is a fragmented cross-sectional view of a bell end of one pipe using a gasket in accordance with the present invention and of a spigot end of another pipe entering the bell end.
Figure 2:
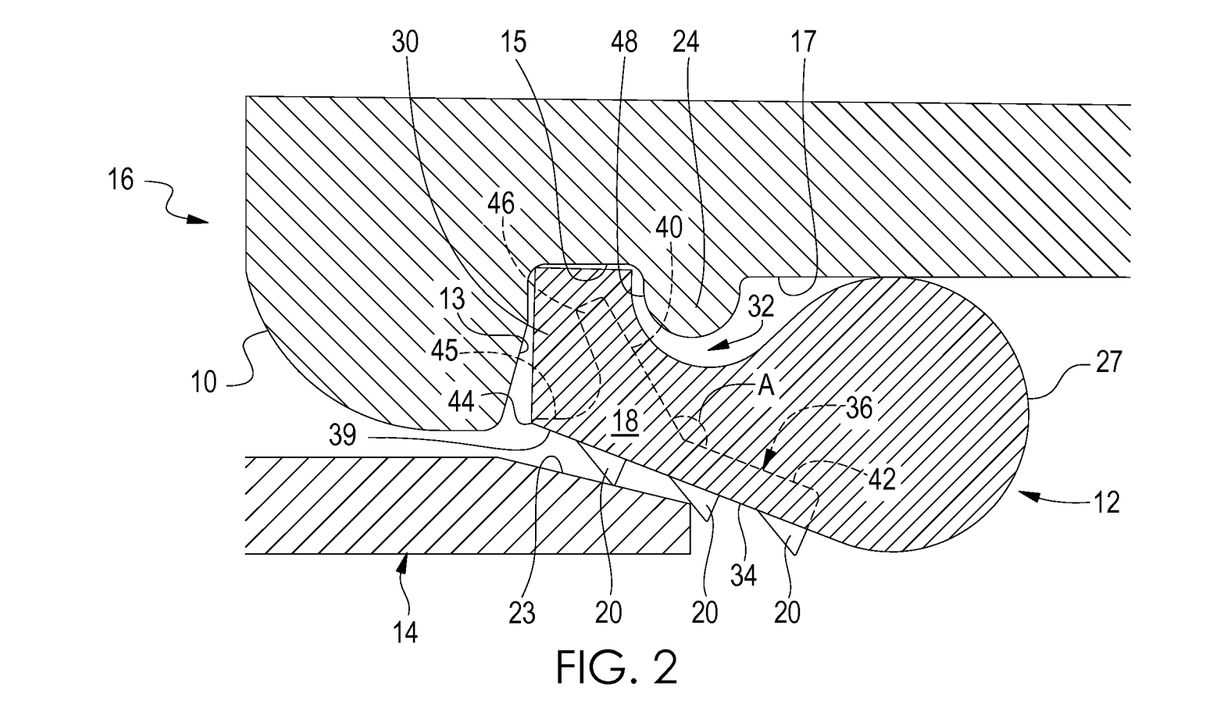
FIG. 2 is a fragmented cross-sectional view of the bell end, gasket and spigot end of FIG. 1 illustrating initial contact between the spigot end and a metal segment embedded in the gasket.

Generally, gasket 12 is arranged for inhibiting leakage about joint 16 between the inside walls of bell end 10 and the outside wall of spigot end 14. More particularly, as illustrated in FIGS. 1 and 2, the inner surface of bell end 10 includes a retainer groove 11 bounded by a radially extending front wall 13 and an axially extending retainer wall 15, and a compression rib 17 which extends radially inward from an axially extending sealing wall 19. Extending radially inward from retainer wall 15 between front wall 13 and rib 17 is a retainer shoulder 24. Retainer shoulder 24 may be arranged as a bead, as illustrated in the figures, or as a corner or edge as depicted in U.S. Pat. No. 6,688,652. Gasket 12 is positioned within the retainer groove with an outer face thereof being arranged adjacent to axially extending retainer wall 15, a heel portion 30 arranged between front wall 13 and retainer shoulder 24, and a sealing bulb portion 27 arranged against compression rib 17. The outer face of gasket 12 includes an annular groove 32 formed between heel portion 30 and sealing portion 27 which partially encircles retainer shoulder 24.

Inserted into gasket 12 are a plurality of substantially Y-shaped metal segments 18. As depicted in FIG. 14, segments 18 may be spaced apart equally in a circumferential direction around the periphery of gasket 12. Metal segments 18 are firmly vulcanized into radial grooves found within heel portion 30 in gasket 12. The number of metal segments 18 inserted into gasket 12 varies depending upon the anticipated fluid pressure at joint 16 and the size of the pipes involved.

Metal segments 16 are configured for decreasing the spigot insertion forced required to seat the spigot end within the bell end and gasket and decrease the radial load exerted between the joined pipes upon pressurization thereof. To that end, each metal segment 18 includes a substantially flat, inner surface 34 and an outer surface 36. Inner surface 34 is arranged parallel to an inner radial face 39 of heel portion 30. In some instances, inner surface 34 of segment 18 may be exposed thereby forming a portion of inner radial face 39 of heel portion 30. In other instances, inner surface 34 may be embedded within the gasket material of gasket 12. One or more teeth 20 are arranged to extend radially inwardly from inner surface 34. As depicted in FIGS. 1 through 10, segment 18 may include three teeth 20, with one tooth recessed from a front end of segment 18, a second tooth arranged at a back end of segment 18 and a third tooth arranged between the first tooth and second tooth. Alternatively, as depicted in FIG. 11, metal segment 18 may include a single tooth located adjacent to the front edge of segment. As depicted in FIG. 12 metal segment 18 may include a single tooth located substantially equidistance between the front and back ends of segment 18. FIG. 13 depicts another alternative metal segment 18 including a pair of teeth, with one tooth located adjacent to a front end of segment 18 and a second tooth arranged at a back end of segment 18. In each instance where at least two teeth are present, the teeth are arranged to be planar meaning the acutely pointed tips of the teeth are coplanar. Thus, the teeth are not arranged in an arc. During formation of joint 16 and the subsequent pressurization thereof, this feature inhibits rotation of the metal segments between the bell end 10 and spigot end 14, while promoting the translation of segment 18 toward front wall 13.

Outer surface 36 of segment 18 is composed of a number of substantially flat sections including a back section 42, which extends parallel to inner surface 34 of segment 18 into sealing bulb portion 27, a radially outwardly extending section 40 supported by an arm 46, and a front section 45, which tapers toward inner surface 34 to form a nose 44. Outwardly extending section 40 and back section 42 of outer surface 36 form an angle A of approximately 140°, which may range between about 90° and about 170°. Outwardly extending section 40, and to a lesser extent arm 46, are arranged to extend upwardly from a point below a substantially central portion of annular groove 32 to lie immediately adjacent to or to be tangential to a forward face 48 of annular groove 32. Further, in certain applications, section 40 may not be flat. It is anticipated that section 40 can be curved, for example, being concaved or convex. It is also anticipated that front section 45 extends directly toward the tip of arm 46, or adjacent to the tip, rather than toward the base thereof. In this configuration, nose 44 defines an angle of about 90°.

Figure 3:
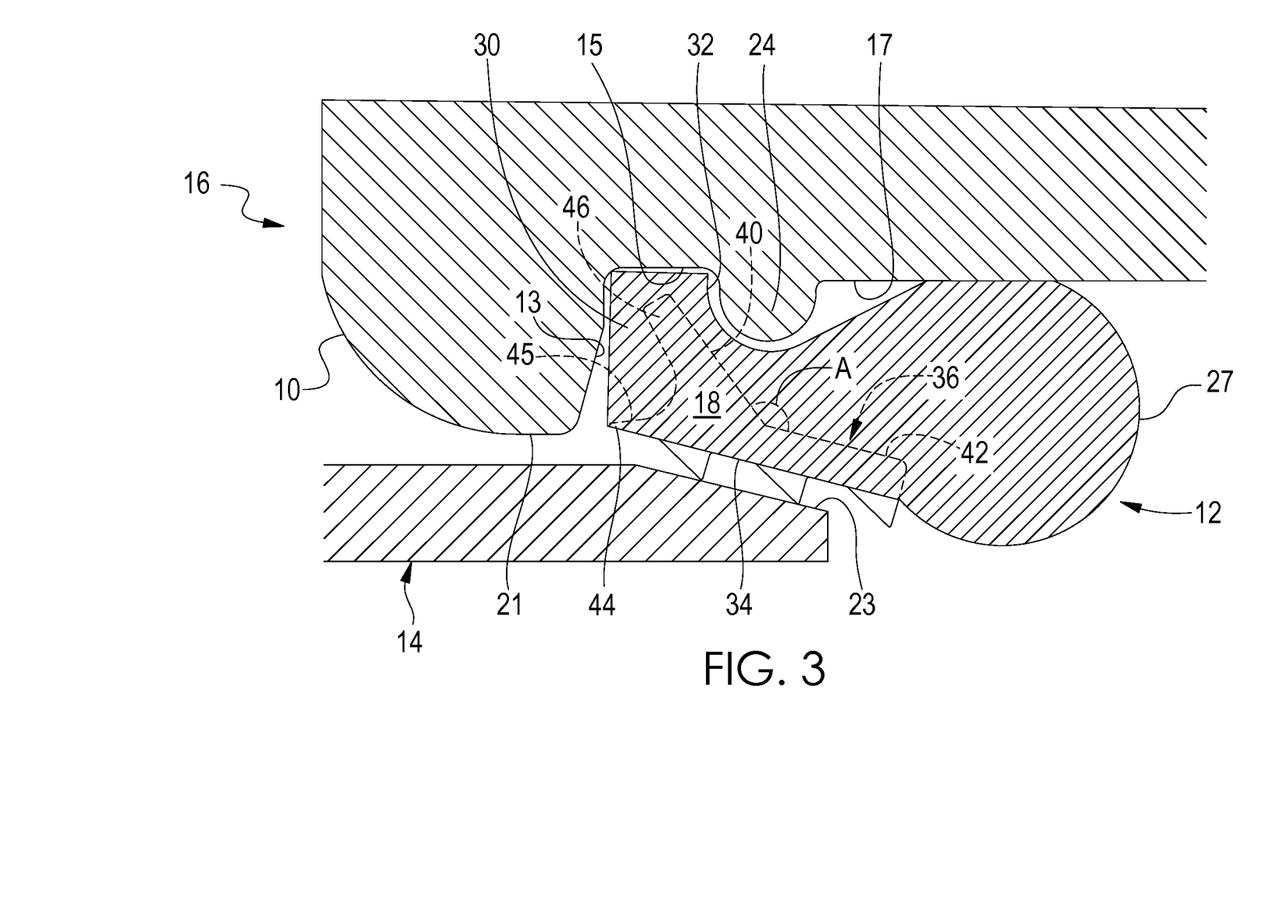
FIG. 3 is a fragmented cross-sectional view of the bell end, gasket and spigot end of FIG. 2 illustrating contact between the spigot end and the metal segment as the spigot end is inserted farther into the bell end.
Figure 4:
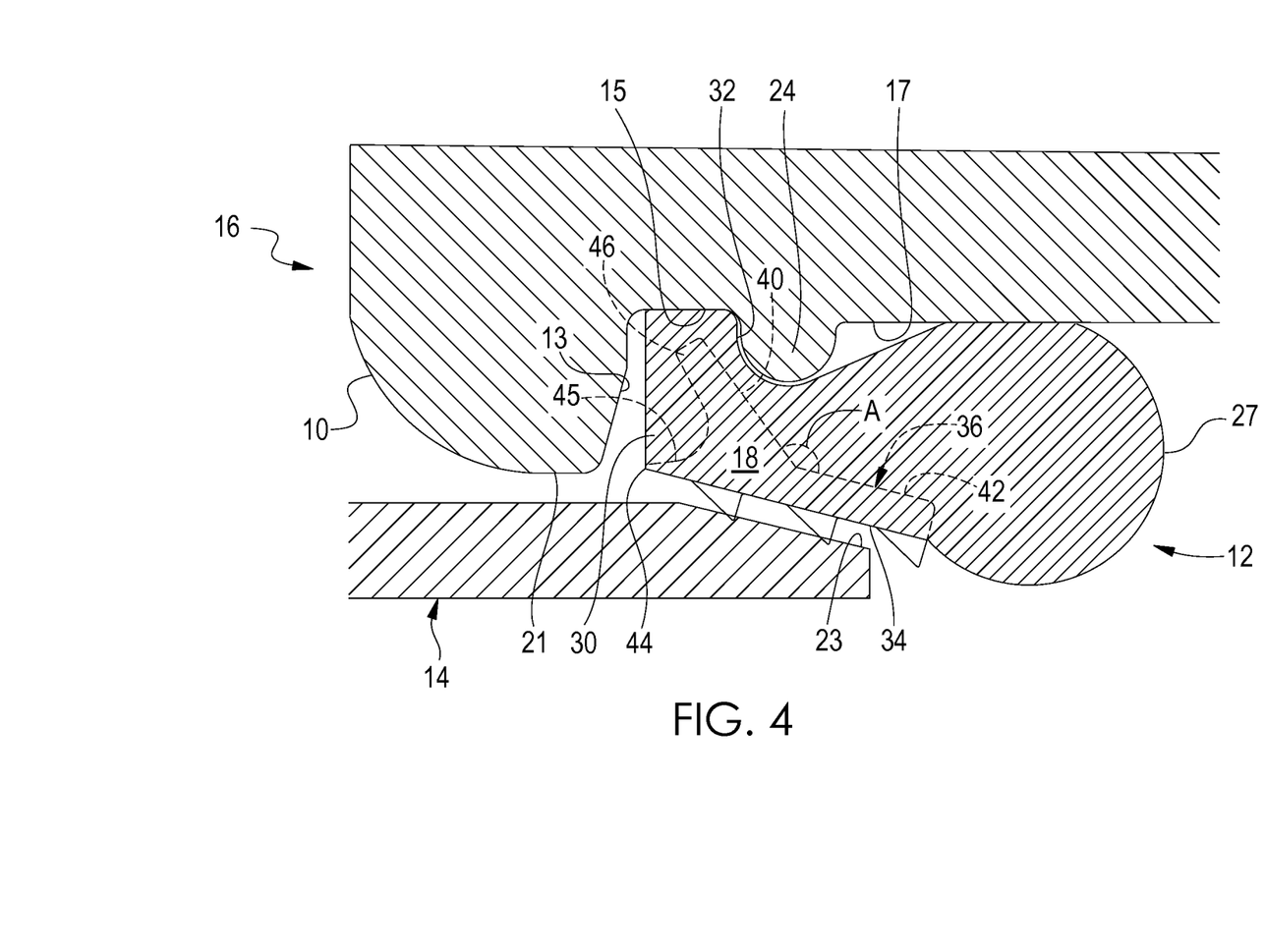
FIG. 4 is a fragmented cross-sectional view of the bell end, gasket and spigot end of FIG. 3 illustrating contact between the spigot end and the metal segment as the spigot end is inserted farther into the bell end.

Referring to FIGS. 1 and 2, as joint 16 is assembled, a throat 21 of bell end 10 guides spigot end 14 into the pipe bell and gasket until a beveled end 23 of spigot end 14 contacts a first tooth of teeth 20. Alternatively, when the single-toothed segment illustrated in FIG. 12 is used in gasket 12, spigot end 14 may contact the conical inner radial face 39 of heel portion 30 of gasket 12 prior to contacting single tooth 20. As illustrated in FIGS. 3 and 4, as spigot end 14 continues to slide through gasket 12, retainer shoulder 24 engages with annular groove 32 of gasket 12 thereby preventing the gasket from dislodging from retainer groove 11. The wedging action between beveled end 23 and the conical inner radial face 39 compresses sealing bulb portion 27 between spigot end 14 and compression rib 17 thereby creating a seal between the interconnected pipes and pressing spigot tooth 20 into spigot end 14.

Figure 5:
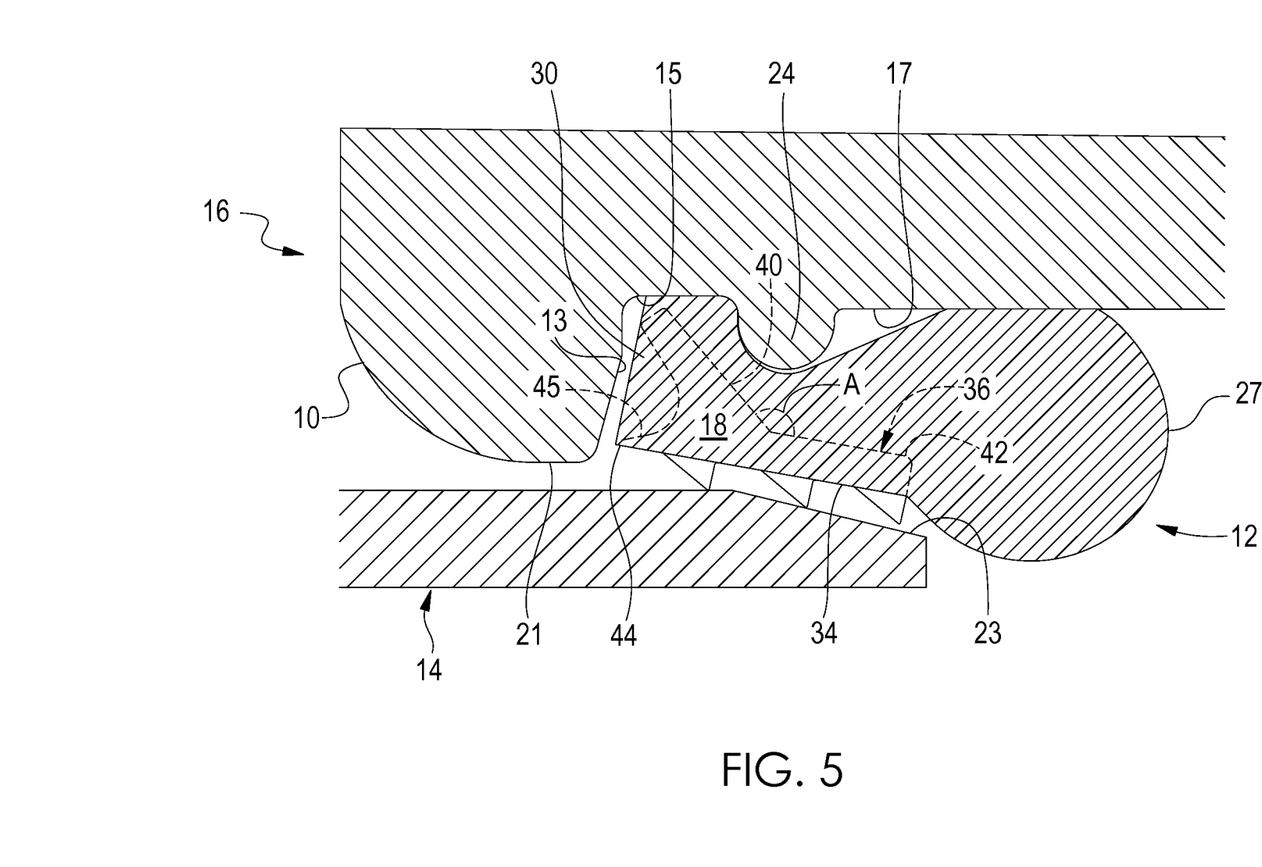
FIG. 5 is a fragmented cross-sectional view of the bell end, gasket and spigot end of FIG. 4 illustrating contact between the spigot end and the metal segment as the spigot end is inserted farther into the bell end.
Figure 6:
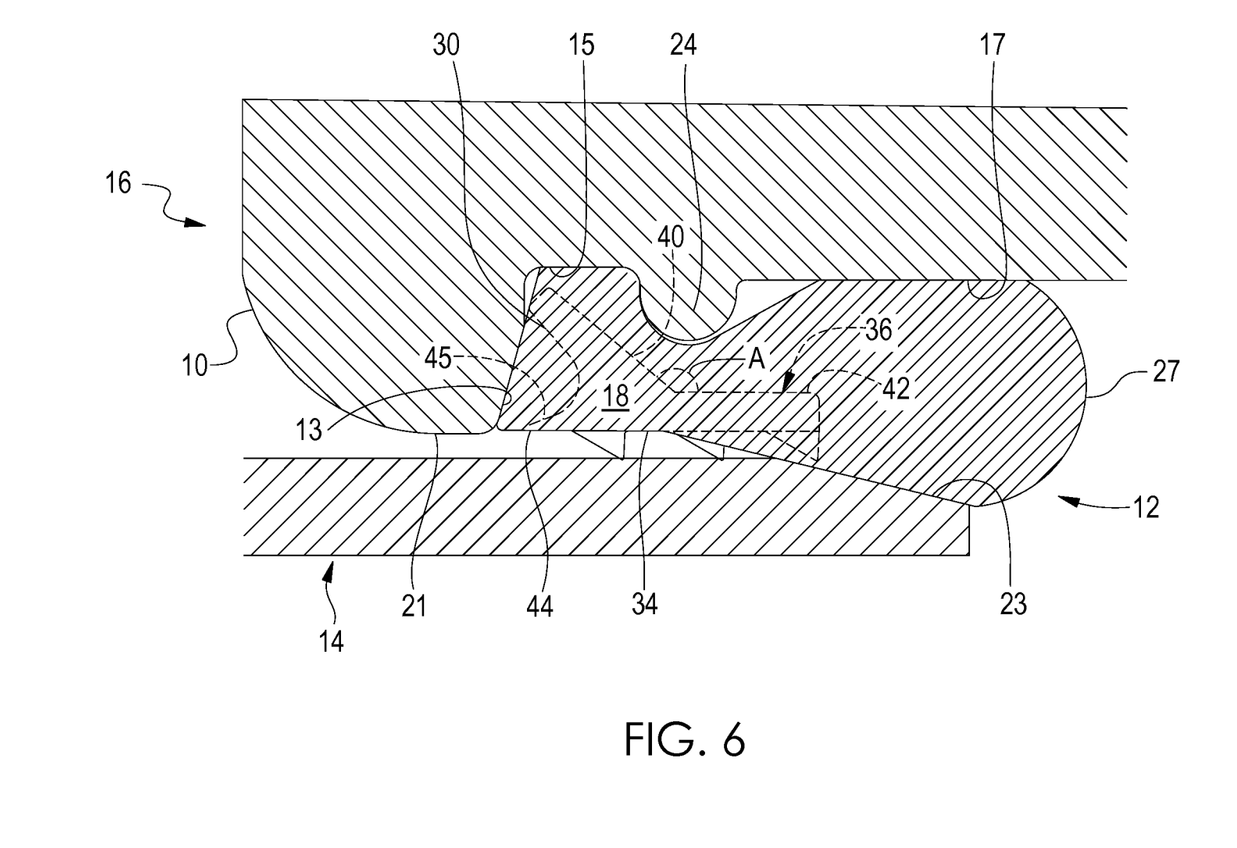
FIG. 6 is a fragmented cross-sectional view of the bell end, gasket and spigot end of FIG. 5 illustrating contact between the spigot end and the metal segment as the spigot end is inserted farther into the bell end.

Contrary to prior art gaskets that include embedded metal locking segments, the compression of sealing bulb portion 27 of the present invention occurs with essentially no rotation of metal segment 18 around retainer shoulder 24. Instead, the interaction of beveled end 23 and co-planar arranged teeth 20 displaces segment 18 substantially radially outwardly rather than rotationally around a bead or shoulder. This causes heel portion 30 to be compressed, upon insertion of the spigot end 14 into gasket 12, together with sealing bulb portion 27. Additionally, as metal segment 18 is displaced by the compression of gasket 12, radially outwardly extending section 40 is brought to bear against retainer shoulder 24 indirectly through a portion of heel portion 30 located between section 40 and forward face 48 of annular groove 32. As depicted in FIGS. 4 through 6, the interaction of radially outwardly extending section 40, retainer shoulder 24 and forward face 48 of annular groove 32 during compression of gasket 12 imparts an axial displacement of segment 18 in combination with the radially outward displacement of the segment. Together, the axial and radially outward displacements of the segment result in the translation of segment 18 radially away from spigot end 14 and in a direction opposite to the insertion direction of spigot end 14 into gasket 12. This action allows for the amount of force required to insert spigot end 14 through gasket 12 to be less than what is required in current gaskets since the segments in the present invention move away from the spigot during spigot insertion into gasket 12 rather than engaging the spigot end, rotating between the bell end and the spigot end, which increases the radial load between the pipes. Further, this action and the arrangement of segments 18 within gasket 12 also increase the amount of acceptable misalignment tolerance between spigot end 14 and bell end 10 when forming joint 16 since gasket 12 is less likely to be forced out of the retainer groove by the insertion of a misaligned spigot end than in the prior art arrangements, which can cause gasket 12 to be pushed out of the retainer grove by the force exerted by the misaligned spigot end.

Figure 7:
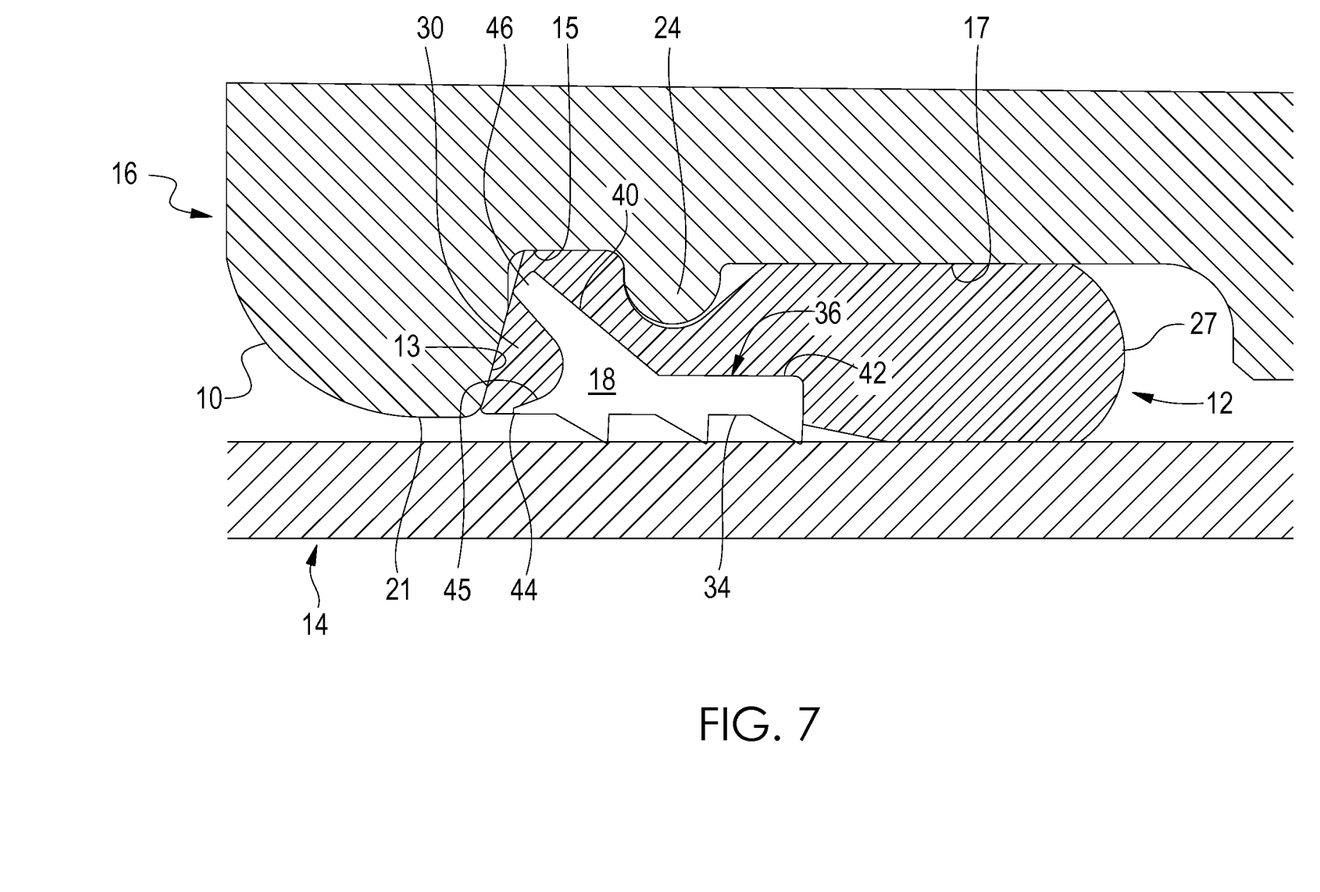
FIG. 7 is a fragmented cross-sectional view of the bell end, gasket and spigot end of FIG. 6 illustrating the spigot end fully inserted into the bell end.

Referring to FIG. 7, when spigot end 14 is fully inserted through gasket 12 and into bell end 10, with beveled end 23 inserted fully passed sealing bulb portion 27, all three teeth 20 of segment a 18 are in contact with spigot end 14. Further, arm 46 is brought to bear against front wall 13, either directly or through heel portion 30 of gasket 12.

Figure 8:
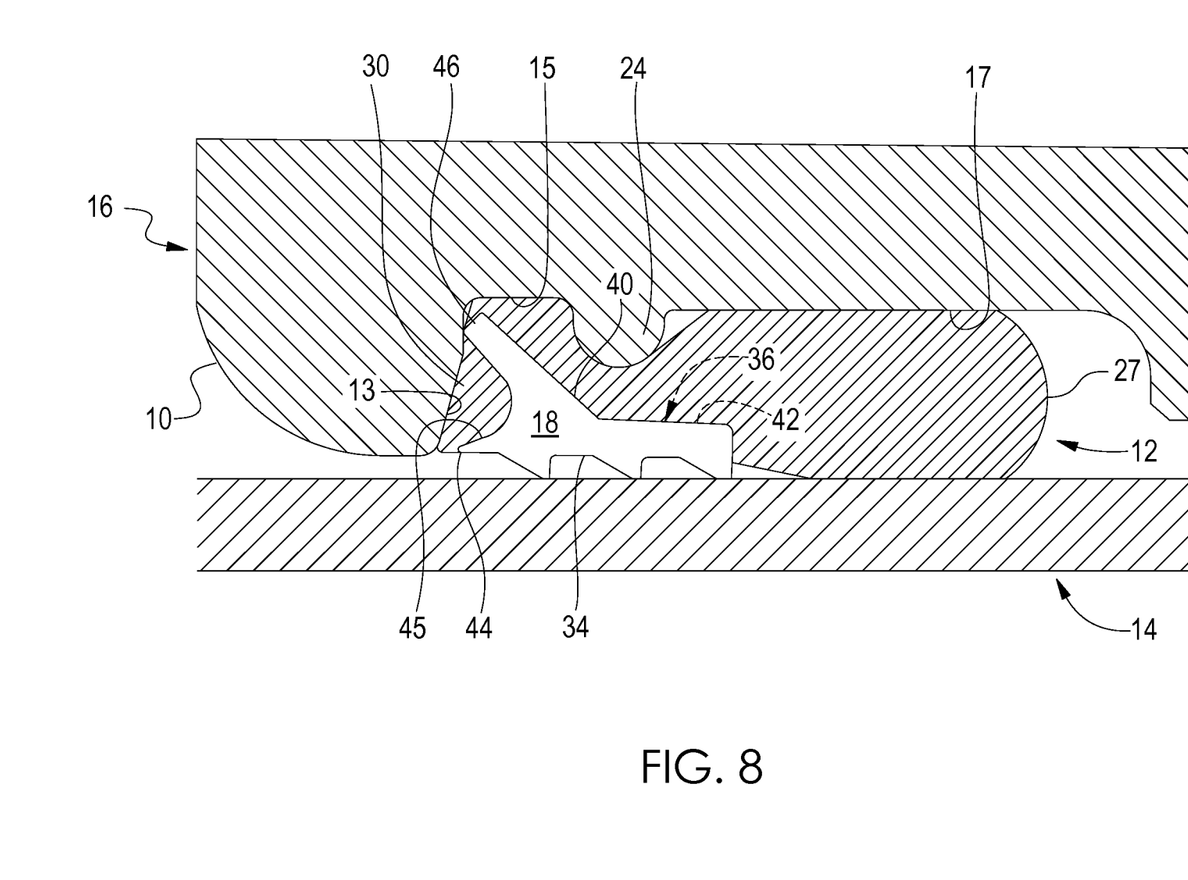
FIG. 8 is a fragmented cross-sectional view of the bell end, gasket and spigot end of FIG. 7 illustrating the arrangement of the metal segment upon initial pressurization of the telescoped pipes.
Figure 9:
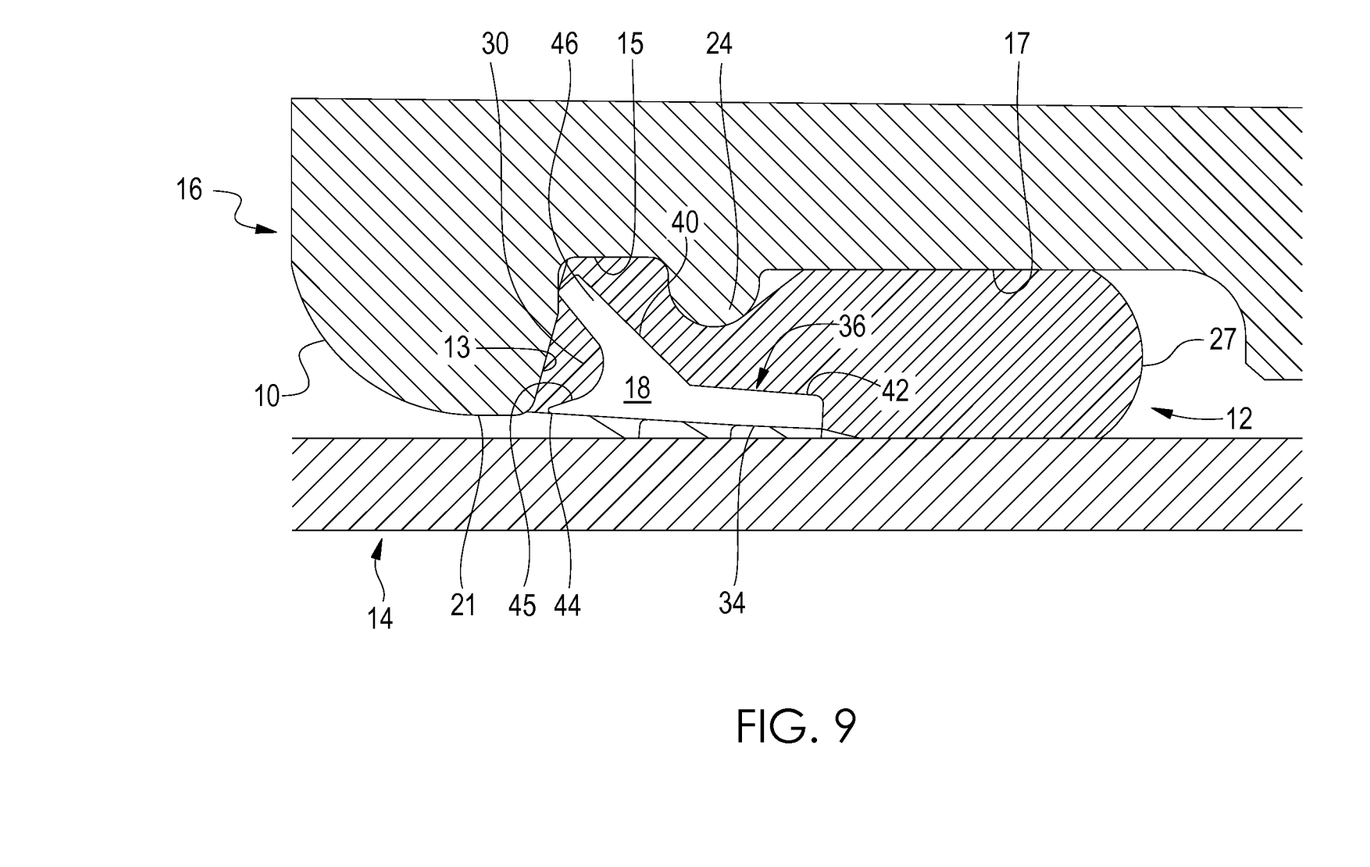
FIG. 9 is a fragmented cross-sectional view of the bell end, gasket and spigot end of FIG. 8 illustrating the arrangement of the metal segment upon further pressurization of the telescoped pipes.

Referring to FIG. 8, upon initial pressurization of joint 16, teeth 20 engage with spigot end 14 by friction or by penetrating into spigot end 14 a short distance. This occurs as the axial load created by the tendency of the pipes to want to separate when under pressure is transmitted radially and axially through and between arm 46 and teeth 20 to front wall 13 of the retainer grove and spigot end 14. As the axial pressure within joint 16 is increased to normal operating pressures, teeth 20 are caused to penetrate, or penetrate father, into spigot end 14. Additionally, arm 46, if it has not already, comes to bear directly against front wall 13 of the retainer groove thereby arresting axial movement of segment 18 and locking gasket 12 in place within the retainer groove between bell end 10 and spigot end 14.

Figure 10:
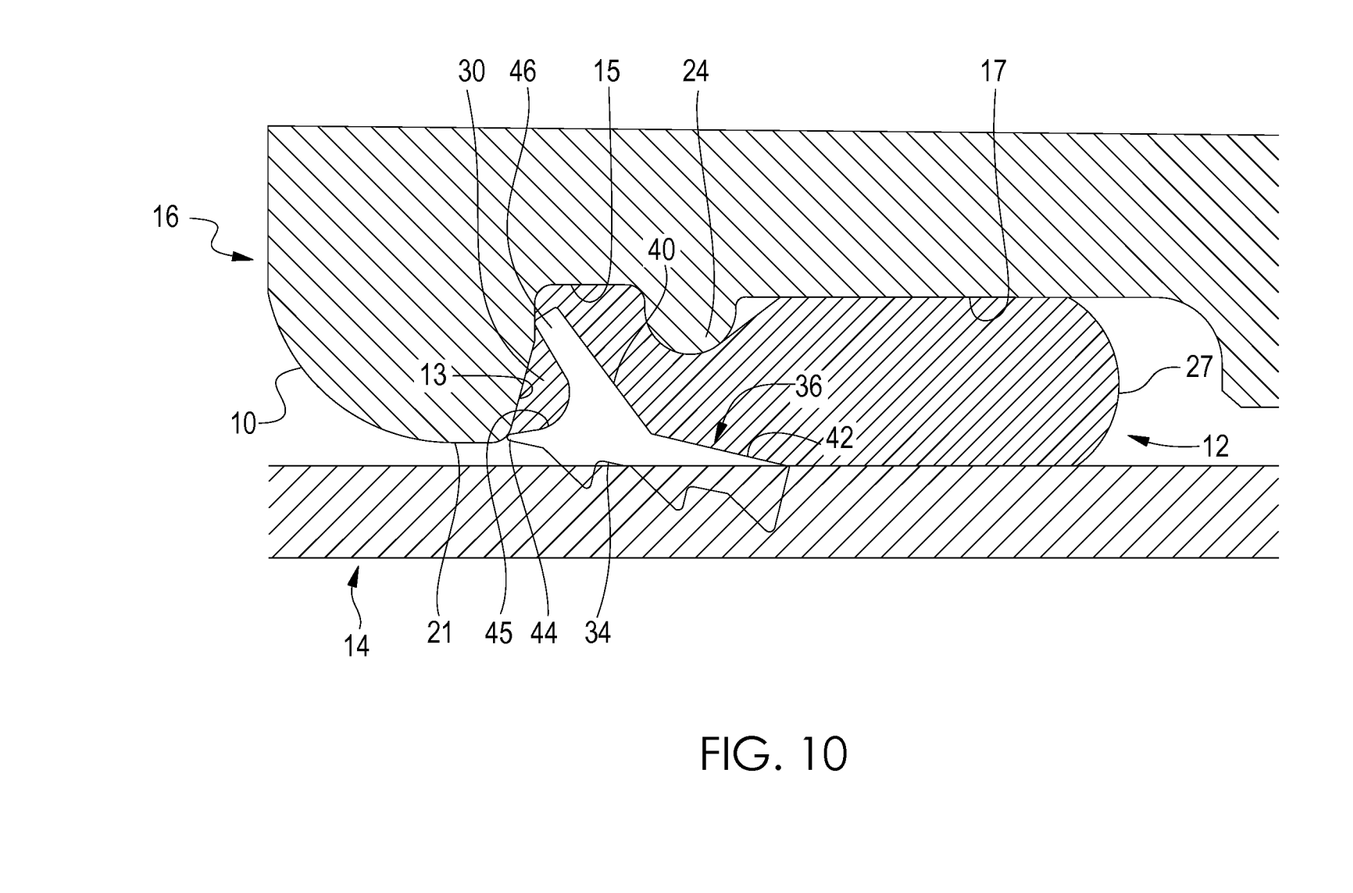
FIG. 10 is a fragmented cross-sectional view of the bell end, gasket and spigot end of FIG. 9 illustrating the arrangement of the metal segment upon over-pressurization of the telescoped pipes.

As depicted in FIG. 10, when pipe joint 16 is over-pressurized, segment 18 is caused to rotate between spigot end 14 and bell end 10 thereby causing the tooth 20 that is adjacent to the back end of the segment to penetrate deeply into spigot end 14. To prevent over-rotation of segment 18 and ensuing damage to spigot end 14 by teeth 20, nose 44 of segment 18 is configured to engage a lower portion of front wall 13 of retainer groove 11 about throat 21. The engagement of nose 44 with front wall 13 acts to prevent further rotation of segment 18 and reduce the radial load imparted by segment 18 on spigot end 14 by transferring the load axially to front wall 13 of the retainer groove. In certain instances, the pressure may be great enough to cause arm 46 and nose 44 to bend and spread apart from one another. When this occurs, nose 44 may slide inwardly a short distance into throat 23 where it becomes wedged between bell end 10 and spigot end 14. This wedging action converts nearly all of the radial load created by over-pressurization of joint 16 into an axial load exerted between bell end 10 and spigot end 14.

As will be apparent to one skilled in the art, various modifications can be made within the scope of the aforesaid description. Such modifications being within the ability of one skilled in the art form a part of the present invention and are embraced by the claims below.

It is claimed:

1. A method of forming a seal between a spigot end of a first pipe and a bell end of a second pipe, the bell end including a retainer groove defined, at least in part, by a front wall and a retainer groove shoulder, the method comprising:
    providing a gasket having a compressible body with a heel portion, a sealing portion and a plurality of metal segments at least partially embedded in the heel portion, at least one of the metal segments of the plurality of metal segments including an outer surface, an inner surface, a nose portion formed by an intersection of the outer surface and the inner surface, an arm projecting radially outward from the outer surface and three or more teeth extending radially inwardly from the inner surface,
    placing the gasket into the gasket receiving groove, and
    inserting the spigot end into the bell end and through the gasket thereby translating the at least one metal segment a distance in a desired direction,
    wherein the retainer groove shoulder bears against a substantially flat first portion of the arm via a portion of the compressible body and the desired direction is achieved, at least in part, by bearing, either directly or indirectly through the compressible body, the arm against the retainer groove shoulder, and
    wherein the teeth are arranged such that the tips of the teeth are coplanar in a plane that is angled relative to a direction of movement of the spigot end as it is inserted into the bell end.

2. The method according to claim 1 wherein the desired direction includes a radial component and an axial component.

3. The method according to claim 2 wherein the radial component is radially outward from the second pipe.

4. The method according to claim 2 wherein the axial component is away from a direction of movement of the spigot end as it is inserted into the bell end and through the gasket.

5. The method according to claim 3 wherein, when the at least one metal segment includes three teeth that are coplanar.

6. The method according to claim 1 wherein the arm is arranged at an obtuse angle to a rear length of the outer surface, the obtuse angle opening away from the front wall, and at an acute angle to the inner surface, the acute angle opening towards the front wall.

7. The method according to claim 1 further comprising arresting withdrawal of the spigot end from the bell end by bearing an end of the arm against the front wall.

8. The method according to claim 7 further comprising arresting withdrawal of the spigot end from the bell end by bearing the nose portion of the at least one metal segment against the front wall.

9. The method according to claim 8 further comprising spreading the arm and the nose apart by bearing the at least one metal segment against the front wall.

10. A method of forming a seal between a spigot end of a first pipe and a bell end of a second pipe, the bell end including a retainer groove defined, at least in part, by a front wall and a retainer groove shoulder, the method comprising:
    providing a gasket having a compressible body with a heel portion, a sealing portion and a plurality of metal segments at least partially embedded in the heel portion, at least one of the metal segments of the plurality of metal segments including an outer surface, an inner surface, a nose portion formed by an intersection of the outer surface and the inner surface, an arm projecting radially outward from the outer surface and three or more teeth extending radially inwardly from the inner surface, placing the gasket into the gasket receiving groove, inserting the spigot end into the bell end and through the gasket thereby translating the at least one metal segment a distance in a desired direction, and arresting withdrawal of the spigot end from the bell end by bearing an end of the arm against the front wall wherein the desired direction is achieved, at least in part, by bearing, either directly or indirectly through the compressible body, the arm against the retainer groove shoulder, and wherein the teeth are arranged such that the tips of the teeth are coplanar in a plane that is angled relative to a direction of movement of the spigot end as it is inserted into the bell end.

11. The method according to claim 10 wherein the desired direction includes a radial component and an axial component.

12. The method according to claim 11 wherein the radial component is radially outward from the second pipe.

13. The method according to claim 11 wherein the axial component is away from a direction of movement of the spigot end as it is inserted into the bell end and through the gasket.

14. The method according to claim 12 wherein, when the at least one metal segment includes three teeth that are coplanar.

15. The method according to claim 10 wherein the arm is arranged at an obtuse angle to a rear length of the outer surface, the obtuse angle opening away from the front wall, and at an acute angle to the inner surface, the acute angle opening towards the front wall.

16. The method according to claim 15 further comprising arresting withdrawal of the spigot end from the bell end by bearing the nose portion of the at least one metal segment against the front wall.

17. The method according to claim 16 further comprising spreading the arm and the nose apart by bearing the at least one metal segment against the front wall.

* * * * *